United States Patent
Kim et al.

(10) Patent No.: US 7,788,797 B2
(45) Date of Patent: Sep. 7, 2010

(54) METHOD OF MAKING A PERPENDICULAR MAGNETIC RECORDING WRITE HEAD WITH NOTCHED TRAILING SHIELD

(75) Inventors: John I. Kim, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 691 days.

(21) Appl. No.: 11/735,894

(22) Filed: Apr. 16, 2007

(65) Prior Publication Data

US 2007/0247746 A1    Oct. 25, 2007

Related U.S. Application Data

(63) Continuation-in-part of application No. 11/379,969, filed on Apr. 24, 2006.

(51) Int. Cl.
*G11B 5/127* (2006.01)
*H04R 31/00* (2006.01)

(52) U.S. Cl. .............. 29/603.16; 29/603.11; 29/603.13; 29/603.14; 29/603.15; 29/603.18; 216/62; 216/65; 216/66; 360/121; 360/122; 360/317; 451/5; 451/41

(58) Field of Classification Search .............. 29/603.11, 29/603.13–603.16, 603.18; 360/121, 122, 360/317; 451/5, 41; 216/62, 65, 66
See application file for complete search history.

(56) References Cited

U.S. PATENT DOCUMENTS

| | | | |
|---|---|---|---|
| 5,349,745 A * | 9/1994 | Kawabe et al. ........... 29/603.18 |
| 5,567,333 A | 10/1996 | Hira et al. | |
| 6,510,022 B1 * | 1/2003 | Lahiri et al. ........... 360/125.56 |
| 2003/0231426 A1 | 12/2003 | Sato | |
| 2004/0212923 A1 | 10/2004 | Taguchi | |
| 2004/0218312 A1 | 11/2004 | Matono | |
| 2005/0068665 A1 | 3/2005 | Le et al. | |
| 2005/0243464 A1 | 11/2005 | Lille | |
| 2005/0259355 A1 | 11/2005 | Gao et al. | |
| 2005/0264931 A1 | 12/2005 | McFadyen | |
| 2006/0174474 A1 * | 8/2006 | Le ........................ 29/603.12 |
| 2007/0245545 A1 * | 10/2007 | Pentek et al. ........... 29/603.13 |

OTHER PUBLICATIONS

EPO Search Report.
A.I. Stognij e tal., "Reactive Ion-Beam Etching of Thick Polyimide Layers in an Oxygen+Argon Mixture", Russian Microelectronics, vol. 30, No. 5, 2001, pp. 330-334.

* cited by examiner

*Primary Examiner*—Paul D Kim
(74) *Attorney, Agent, or Firm*—Thomas R. Berthold

(57) ABSTRACT

A method for making a perpendicular magnetic recording write head that has a write pole, a trapezoidal-shaped trailing shield notch, and a gap between the write pole and notch uses a reactive ion beam etching (RIBE) process in $CHF_3$ that removes filler material at the side edges of the write pole and thus widens the opening at the side edges. The gap is formed of a nonmagnetic mask film, such as alumina, a nonmagnetic metal protective film and a nonmagnetic gap layer. The nonmagnetic metal film is substantially less reactive to $CHF_3$ than the filler material and protects the underlying mask film and write pole during the widening of the opening. The gap layer and trailing shield notch are deposited into a widened opening above the write pole, so the sides of the notch diverge to cause the generally trapezoidal shape.

5 Claims, 7 Drawing Sheets

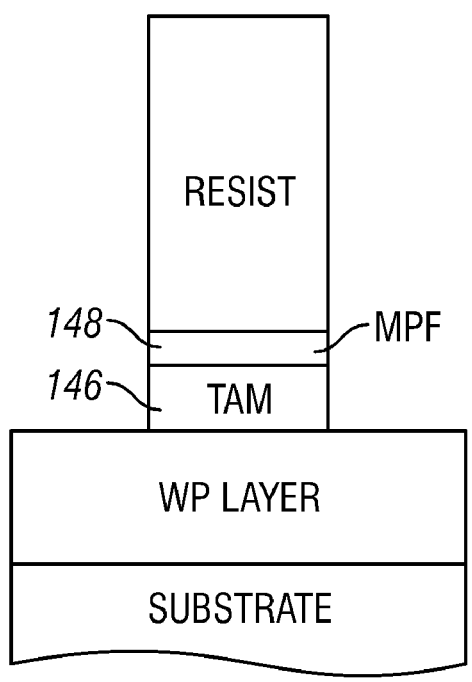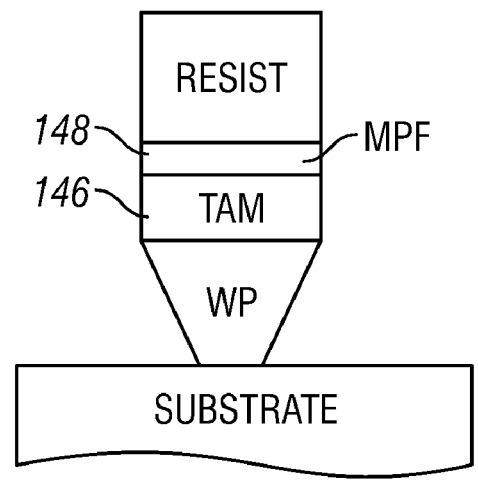
*FIG. 5A*  *FIG. 5B*

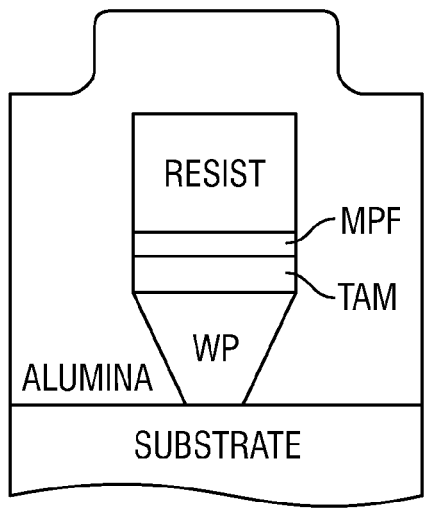
*FIG. 6A*
*FIG. 6B*
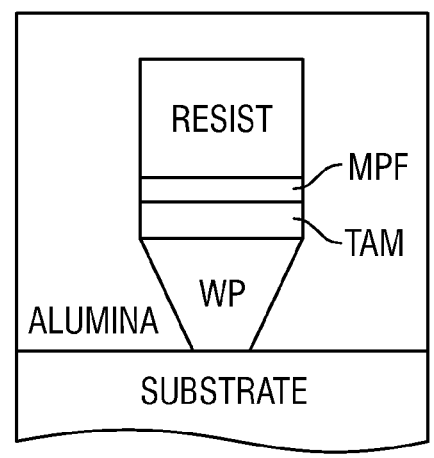
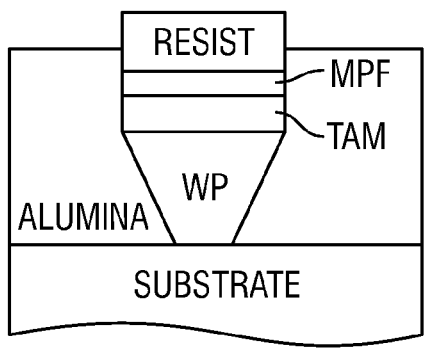
*FIG. 6C*

METHOD OF MAKING A PERPENDICULAR MAGNETIC RECORDING WRITE HEAD WITH NOTCHED TRAILING SHIELD

RELATED APPLICATION

This application is a continuation-in-part of application Ser. No. 11/379,969 filed Apr. 24, 2006.

BACKGROUND OF THE INVENTION

1. Field of the Invention

This invention relates generally to perpendicular magnetic recording write heads, and more particularly to a write head with a notched trailing shield for use in magnetic recording hard disk drives.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. As shown in FIG. 1A, a "dual-layer" medium includes a perpendicular magnetic data recording layer (RL) on a "soft" or relatively low-coercivity magnetically permeable underlayer (SUL) formed on the disk substrate. This type of medium is shown with a single write pole (WP) type of recording head. A thin film coil (C) is shown in section between the WP and the return pole (RP) of the recording head. Write current through coil C induces a magnetic field (shown by dashed line 10) from the WP that passes through the RL (to magnetize the region of the RL beneath the WP), through the flux return path provided by the SUL, and back to the RP. The recording head is typically formed on an air-bearing slider that has its air-bearing surface (ABS) supported above the RL of the medium. In FIG. 1A, the medium moves past the recording head in the direction indicated by arrow 20. The RL is illustrated with perpendicularly recorded or magnetized regions, with adjacent regions having opposite magnetization directions, as represented by the arrows. The magnetic transitions between adjacent oppositely-directed magnetized regions are detectable by the read head (not shown) as the recorded bits.

FIG. 1A also shows a section of a trailing shield (TS) with a trailing shield notch (TSN) that is near the WP but spaced from the WP by a gap of nonmagnetic material. The use of a TS separated from the WP by a nonmagnetic gap slightly alters the angle of the write field and makes writing more efficient. The TSN causes a stronger magnetic field below the WP and sharper magnetic transitions written by the head, which is desirable. FIG. 1B is a view in the direction 1B-1B of FIG. 1A and illustrates the width of the WP to substantially define the trackwidth (TW) of the data recorded in the RL. The TS is substantially wider than the WP in the cross-track direction but the TSN portion is generally the same width as the WP. FIG. 2 is a perspective view showing the relationship between the WP, the TS with TSN, and the recording medium with the RL and SUL. As shown, the TSN is generally rectangularly shaped with a front edge 30 and generally parallel side edges 32, 34. FIG. 3 is a view of the slider ABS, as seen from the disk, and shows portions of the write head, with details of the WP, the TSN and the gap between the WP and the TSN. The WP has an end 40 generally parallel to the ABS and a trailing edge 42 that is generally orthogonal to the along-the-track direction and generally defines the TW. The gap typically includes alumina ($Al_2O_3$) as a result of the conventional fabrication process wherein the alumina is a "thin alumina mask" (TAM) formed over the layer of magnetic material used to form the WP. A resist is formed over the TAM and the structure is then ion milled to form the WP. After removal of the resist, the TAM remains above the WP. A thin film 50 of additional gap material, such as Ta or Rh, is deposited over the TAM, followed by electroplating of the magnetic material, typically NiFe, to form the generally rectangularly shaped TSN (with a front edge 30 and generally parallel side edges 32, 34) and the remainder of the TS. One of the problems associated with the write head shown in FIG. 3 is that the generally rectangularly shaped TSN can become saturated during writing.

What is needed is a perpendicular magnetic recording write head with a trailing shield having an improved trailing shield notch and a process for making it.

SUMMARY OF THE INVENTION

The invention is a perpendicular magnetic recording write head with a write pole, a trapezoidal-shaped trailing shield notch, and a gap between the write pole and notch, with the gap being formed of a nonmagnetic mask film, such as alumina, a nonmagnetic metal protective film and a nonmagnetic gap layer. The write pole has a trailing edge that has a width substantially defining the track width and that faces the front edge of the notch but is spaced from it by the gap. The gap layer and trailing shield notch are deposited into a widened opening above the write pole, so the sides of the notch diverge to cause the generally trapezoidal shape, with the notch back edge being substantially wider than the notch front edge, and thus wider than the track width. The write pole has nonmagnetic filler material, such as alumina, surrounding it except at its trailing edge, where it is in contact with the gap. The material of the gap layer is different from the surrounding filler material. The write head is fabricated by a process than includes reactive ion beam etching (RIBE) to remove the filler material at the side edges of the write pole and thus widen the opening at the side edges. The nonmagnetic metal film overlying the mask film, which overlies the trailing edge of the write pole, has substantially reduced sensitivity to the RIBE than the filler material, and thus protects the underlying mask film and write pole during the widening of the opening. This assures greater uniformity in trailing shield gap thicknesses for all of the heads formed on the wafer. After the gap layer and material of the trailing shield are deposited into the widened opening, the result is that the notch has a generally trapezoidal shape and is wider than the write pole. This reduces saturation of the notch during writing.

For a fuller understanding of the nature and advantages of the present invention, reference should be made to the following detailed description taken together with the accompanying figures.

BRIEF DESCRIPTION OF THE DRAWING

FIGS. 5A-5B illustrate the steps in forming the write head of this invention prior to forming the TS with TSN.

FIGS. 6A-6G illustrate the steps in forming the TS with the TSN above the write pole according to this invention.

DETAILED DESCRIPTION OF THE INVENTION

Figure 1A:
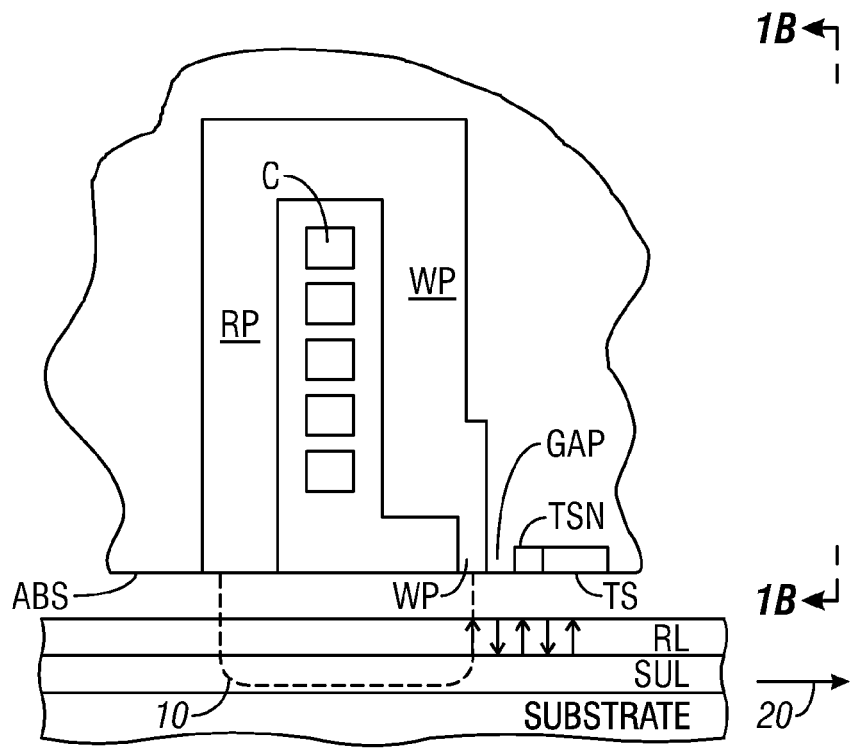
FIG. 1A is a schematic of a prior art perpendicular magnetic recording system.
Figure 1B:
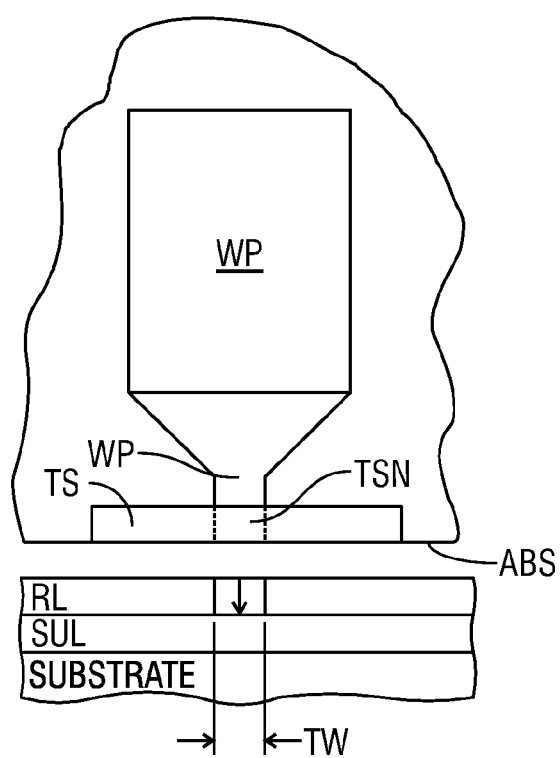
FIG. 1B is a view in the direction 1B-1B of FIG. 1A and illustrates the width of the WP to substantially define the trackwidth (TW) of the data recorded in the RL.
Figure 2:
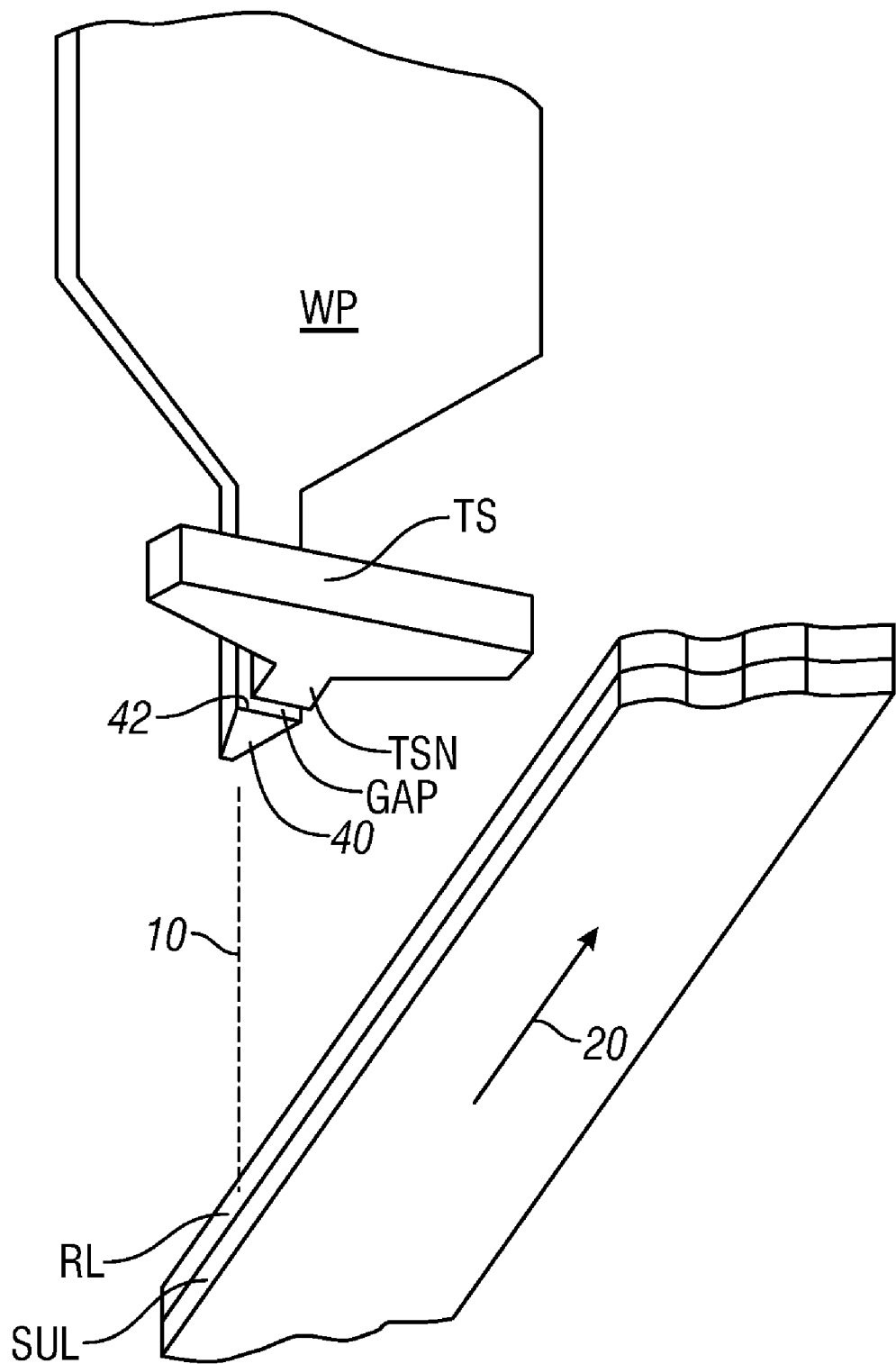
FIG. 2 is a perspective view showing the relationship between the WP, the TS with TSN, and the recording medium with the RL for the system of FIG. 1A.
Figure 3:
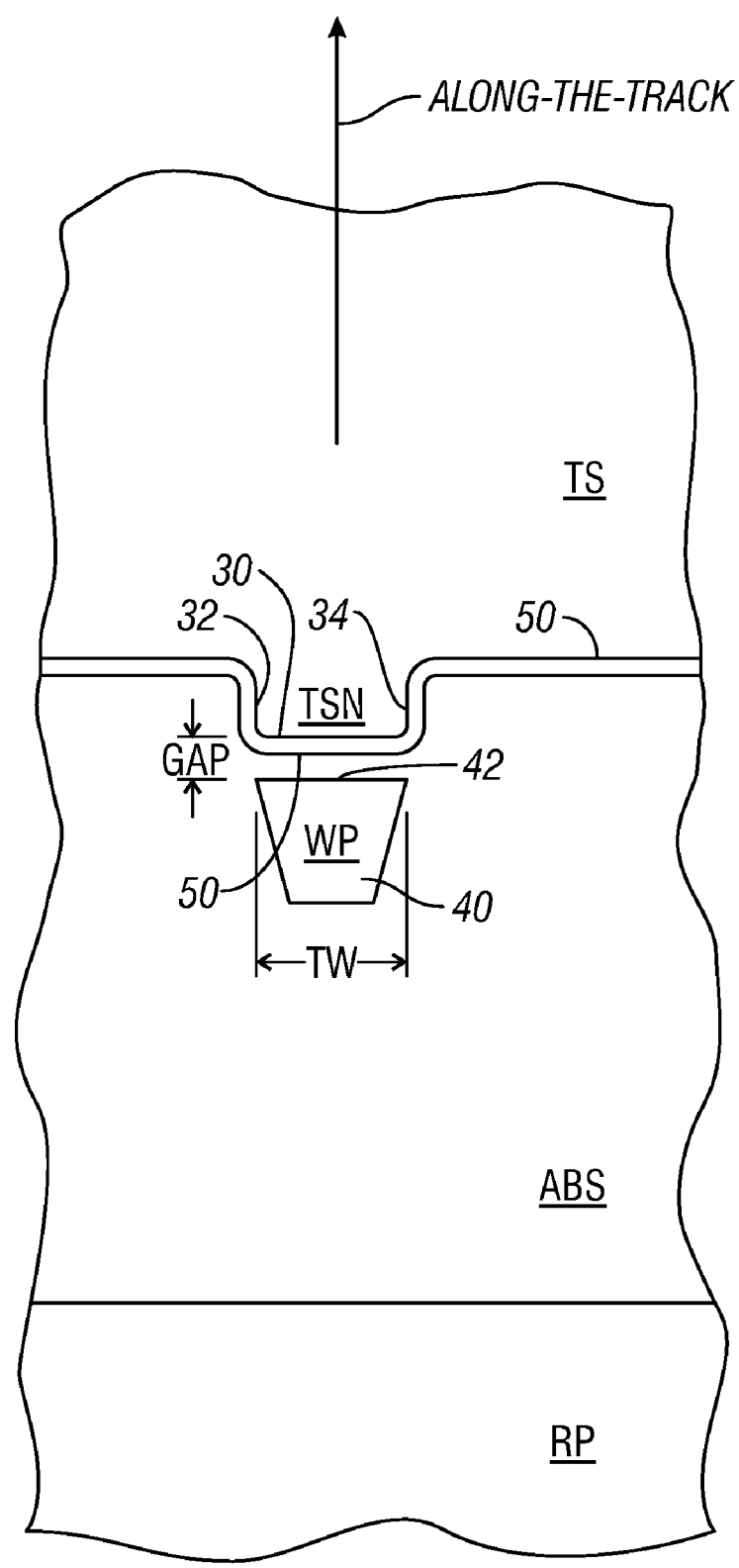
FIG. 3 is a view of the slider ABS for the system of FIG. 1A, as seen from the disk, and shows portions of the write head, with details of the WP, the TSN and the gap between the WP and the TSN.
Figure 4:
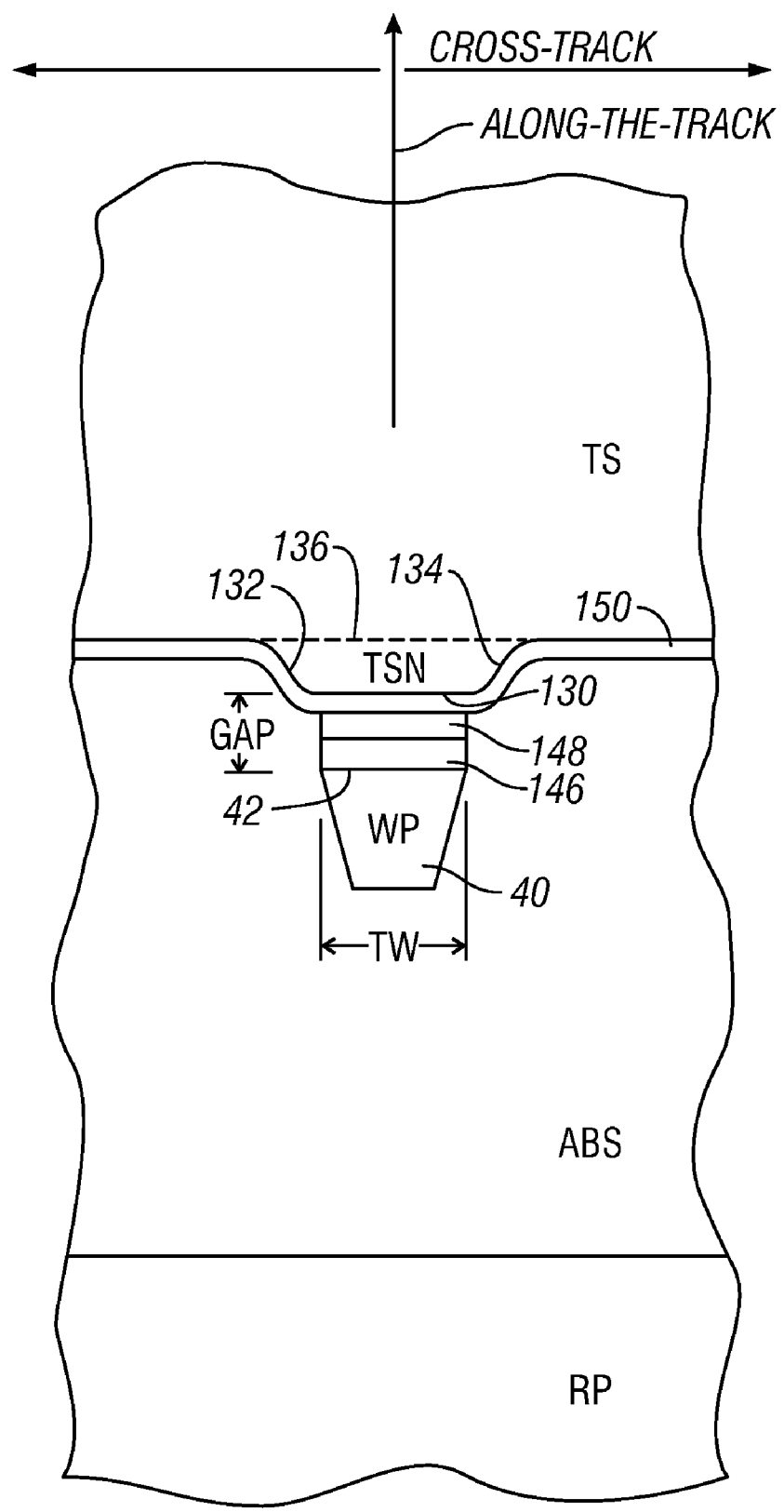
FIG. 4 is a view of the slider ABS for the write head according to this invention, as seen from the disk, and shows portions of the write head, with details of the WP, the trapezoidal-shaped TSN and the films making up the gap between the WP and the TSN.

The perpendicular magnetic recording write head according to this invention is shown in FIG. 4, which is a view of the slider ABS as seen from the disk. The TSN has a generally trapezoidal shape that includes front edge 130 and side edges 132, 134. TSN front edge 130 is generally parallel to the trailing edge 42 of the WP and thus generally orthogonal to the along-the-track direction. The TSN front edge 130 can also have a slight convex curvature. The side edges 132, 134 diverge from the TW as a result of the widened opening above the WP, with the result being that at the base where the TSN ends and the remainder of the TS begins (shown by dashed line 136) the TSN is substantially wider than the TW. The gap G between the trailing edge 42 of the WP and the TSN front edge 130 includes a nonmagnetic mask film 146, a nonmagnetic metal protective film 148 and nonmagnetic gap layer 150. The mask film 146 is typically formed of alumina, and the metal protective film 148 may be formed of Rh, Ir, Ru or Ti, or alloys thereof, or other metal alloys like NiCr. The gap layer 150 is formed entirely of material different from the material on the sides of the WP. For example, the WP typically has alumina on its sides, but the gap layer 150 is formed of a conductive nonmagnetic metal, such as Ta, Rh, Ru or Ir. The WP has a typical thickness in the range of about 150-250 nm, the mask film 146 has a typical thickness of about 10 to 40 nm, the metal protective film has a typical thickness in the range of about 1 to 5 nm, and the gap layer 150 has a typical thickness in the range of about 15 to 40 nm. Thus the overall typical thickness of the gap is between about 30 and 60 nm. The TW is in the range of about 80 to 150 nm, and the distance between front edge 130 and the base 136 is in the range of about 20 to 150 nm. The widened opening for the TSN results in the base 136 being substantially wider than the TW, e.g., about twice as wide as TW.

FIGS. 5A-5B illustrate the steps in forming the write head of this invention prior to forming the TS with TSN. The structure shown in FIG. 5A includes a "substrate", which is typically an alumina layer, deposited on the wafer from which a large number of read/write heads are fabricated. The layers for forming the read head are not shown and are typically deposited first on the wafer and would be located below the "substrate" in FIG. 5A. A WP layer of magnetic material is deposited on the substrate to a thickness corresponding to the desired thickness of the WP, typically in the range of about 150-250 nm. The WP layer is high-moment magnetic material, such as CoFe or NiFe, and is formed by sputtering or electroplating. A mask film 146, such as a full film of alumina, is deposited over the WP layer, typically by sputtering. If alumina is used for the mask film 146, it is referred to as a "thin alumina mask" (TAM). Other materials that may serve as the mask film 146 include tantalum-oxide, silicon-oxide, silicon-nitride or diamond-like carbon. A thin nonmagnetic metal protective film (MPF) 148 is then deposited on the TAM 146. The purpose of the MPF 148 is to protect the underlying TAM 146 during the subsequent reactive ion beam etching (RIBE) with $CHF_3$ that forms the widened opening. This assures greater uniformity in TS gap thicknesses for all of the heads formed on the wafer. The material of the MPF should thus be substantially more resistant to fluorine-based RIBE than alumina. Materials that may be used for the MPF include nonmagnetic metals, which include their alloys, such as Rh, Ir, and Ti. The MPF may also be formed of other nonmagnetic metal alloys, such as NiCr. A layer of organic mask material, referred to herein as "resist", is deposited and patterned above the MPF and TAM and underlying WP layer. The resist layer may be a photo-sensitive organic material provided it is not sensitive to radiation at the wavelengths used in other lithographic steps for forming the write head, or a photo-insensitive organic material like Durimide® 20-1.2 µm, a polyimide material available from Arch Chemicals, Inc. The organic mask material used for the resist layer should be capable of removal by reactive ion etching (RIE) using $O_2$ or $CO_2$. FIG. 5A shows the structure after reactive ion beam etching (RIBE) with a mixture of $CHF_3$ and Ar has removed the MPF and TAM in the regions not covered by resist. The TAM is highly reactive to the $CHF_3$, but the MPF is substantially less reactive. Thus the ratio of $CHF_3$ to Ar can be decreased to assure there is sufficient Ar+ ions to impact the MPF and remove it.

Next, as shown in FIG. 5B, ion milling with Ar+ ions removes the WP layer in regions not covered by the resist and forms the WP. The use of the TAM together with the resist assists in forming the beveled shape of the WP shown in FIG. 5B because the TAM material (alumina) is removed at a slower rate than the WP material (CoFe) during the ion milling.

Figure 6D:
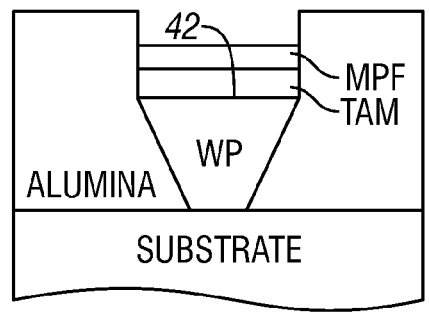

FIGS. 6A-6G illustrate the steps of this invention in forming the TS with the TSN above the write pole. First, in FIG. 6A alumina filler material is deposited over the structure shown in FIG. 5B to fill both side edges of the WP, MPF, TAM and resist. The alumina filler is deposited by sputtering or ion beam deposition to a thickness in the range of about 1.5 micron to cover the resist and fill the sides of the WP. This results in large topographical variations so chemical-mechanical-polishing (CMP) is used to planarize the surface, resulting in the structure of FIG. 6B. Next, in FIG. 6C the alumina filler and a portion of the resist is removed by RIBE with a mixture of $CHF_3$ and Ar, down to about 70 nm above the WP. This results in the resist being somewhat higher than the alumina filler, as shown in FIG. 6C, because alumina is removed at a faster rate than the resist by the RIBE. Next, the remaining resist is removed by reactive ion etching (RIE) using $O_2$ or $CO_2$. Because alumina and the material of the MPF are not significantly affected by the oxygen-based RIE, this RIE removes only the organic resist material above the WP. Thus, the MPF and TAM remain above the trailing edge 42 of the WP, and the alumina filler remains at the sides of the WP, resulting in the structure of FIG. 6D.

Figure 6E:
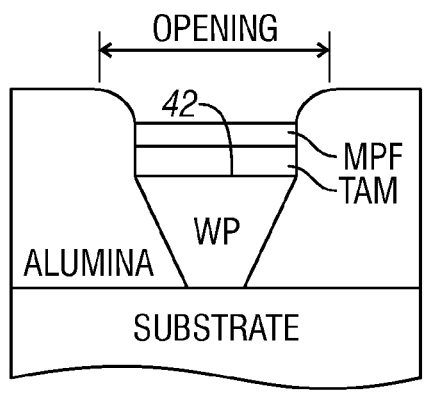

In FIG. 6E, the alumina filler material near the edges of the MPF and TAM are removed, resulting in a widening of the opening above the WP, by RIBE using pure $CHF_3$. This RIBE is performed preferably at a normal angle of incidence and at a very low beam voltage. The normal incidence angle has a strong effect on the alumina filler at the edges of the MPF and TAM and causes widening of the opening substantially greater than the TW of the WP trailing edge 42. If rhodium (Rh) is used as the MPF, the RIBE removes the alumina at about 100 times the rate it removes the Rh MPF. Thus if the RIBE removes about 200 Å of alumina at the edges of the MPF and TAM to form the widened opening, it will remove only about 2 Å of Rh. Angular milling at a relatively high angle of incidence, e.g., about 70 degrees from normal, will also result in widening of the opening. The wafer can be rotated during this RIBE. The low beam voltage and no use of Ar during the RIBE assures that the MPF is not removed and thus the magnetic material of the WP is not damaged. The result, as shown in FIG. 6E, is that the width of the opening is substantially wider than the width of the trailing edge 42 of the WP, with the sides of the opening diverging from the WP trailing edge.

Figure 6F:
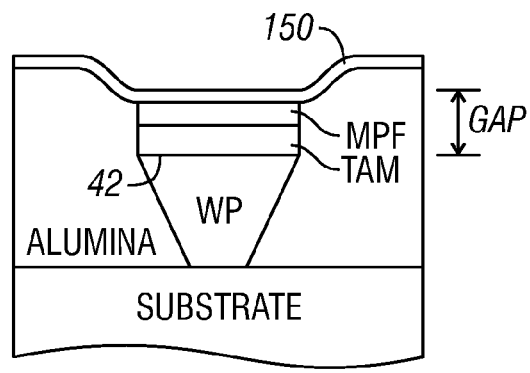
Figure 6G:
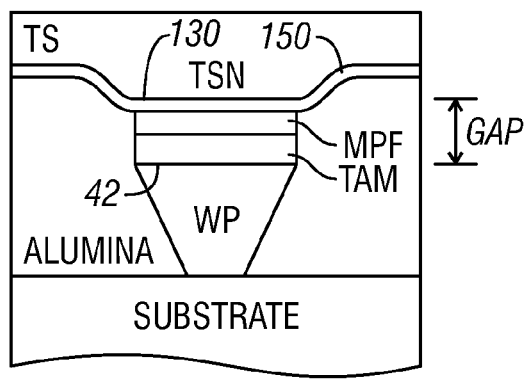

Next, as shown in FIG. 6F, the gap layer 150 material is deposited in the widened opening, typically to a thickness in the range of about 15 to 40 nm, by sputtering. The gap layer 150 covers not only the MPF but the alumina on the sides of the WP. The gap layer 150 may be a nonmagnetic metal, typically Ta, Rh, Ru or Ir. If the TS is to be deposited on the gap layer by electroplating, the gap layer should also be an electrically conductive material. If a non-conducting material is used for the gap layer and the TS is to be deposited by electroplating, then a conductive seed layer can be deposited on the gap layer. Next, in FIG. 6G, the magnetic material for the TS is deposited, typically by electroplating, over the gap layer 150, creating the TSN in the region above the WP, with the TSN having sides that diverge from the WP. The deposition of the TS material into the widened opening may also result in the front edge 130 of the TSN having a slight convex curvature. The TS is a magnetic material, such as CoFe or NiFe. After formation of the TS with the TSN, the write head structure is substantially as shown in FIG. 4.

The process of this invention removes the filler material at the edges of the WP without any significant removal of material directly above the WP because of the protection provided by the MPF, resulting in the widened opening for the subsequent deposition of the gap layer and formation of the TSN. The generally trapezoidal shape of the notch, which is wider than the WP, reduces saturation of the notch during writing. The generally trapezoidal shape of the notch, and the convex curvature of the front edge of the notch, also improves the curvature of the magnetic transitions written by the write pole.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method using reactive ion beam etching (RIBE) in $CHF_3$ for making a perpendicular magnetic recording write head having a write pole and a notched trailing shield comprising:

depositing on a substrate a layer of magnetic write pole material having the desired thickness for the write pole;

depositing a thin nonmagnetic mask film on the write pole layer;

depositing a nonmagnetic metal protective film directly on the mask film;

forming a patterned resist layer on the metal protective film;

etching the metal protective film, underlying mask film and the write pole layer substantially to the substrate to leave the write pole with mask film and metal protective film in regions covered by the patterned resist layer;

covering the patterned resist layer and underlying metal protective film, mask film and write pole with nonmagnetic filler material substantially more reactive to $CHF_3$ than the metal protective film;

removing a portion of the filler material leaving filler material to a thickness greater than the write pole thickness;

removing the resist layer to leave an opening in the remaining filler material exposing the metal protective film and underlying mask film and write pole;

after removal of the resist layer from the metal protective film, removing the filler material at the edges of the metal protective film, without removing the metal protective film, so as to widen said opening by exposing the filler material and the metal protective film to RIBE in $CHF_3$;

depositing a nonmagnetic metal gap layer directly on the metal protective film in said widened opening and directly on the remaining filler material at said widened opening; and depositing over said gap layer a layer of magnetic trailing shield material, the portion of said trailing shield material within said widened opening forming a generally trapezoidal shaped trailing shield notch spaced from the underlying write pole by the gap layer, the metal protective film and the mask film, and the portion of said trailing shield material over the remaining filler material at said widened opening being spaced form the remaining filler material only by the gap layer.

2. The method of claim 1 wherein the trailing shield notch has a front edge facing the write pole, said front edge having a slight convex curvature.

3. The method of claim 1 wherein depositing a thin nonmagnetic mask film comprises depositing a thin alumina film.

4. The method of claim 1 wherein depositing the metal protective film comprises depositing a material selected from the group consisting of Rh, Ir, Ru, Ti, alloys thereof, and a NiCr alloy.

5. The method of claim 1 wherein depositing the gap layer comprises depositing a material selected from the group consisting of Ta, Rh, Ru and Ir.

* * * * *